United States Patent

Bergan

[15] 3,638,902

[45] Feb. 1, 1972

[54] SYSTEM OF DOMES FOR USE IN MOLDING CONCRETE SLABS

[72] Inventor: Philipp O. Bergan, Box 747, Centralia, Ill. 62801

[22] Filed: Nov. 24, 1969

[21] Appl. No.: 879,124

[52] U.S. Cl. .................................. 249/28, 249/29, 249/31
[51] Int. Cl. .......................................................... E04g 11/40
[58] Field of Search .................................. 249/28–32, 176

[56] References Cited

UNITED STATES PATENTS

| | | | |
|---|---|---|---|
| 3,388,452 | 6/1968 | Connolly | 249/29 X |
| 1,713,100 | 5/1929 | Soule | 249/29 X |
| 3,317,178 | 5/1967 | Kreier | 249/134 |
| 3,471,117 | 10/1969 | Haney | 249/176 X |
| 2,881,501 | 4/1959 | Raney | 249/32 X |
| 2,022,784 | 12/1935 | Rice | 249/31 |
| 1,750,760 | 3/1930 | Kepple | 249/28 X |

Primary Examiner—J. Spencer Overholser
Assistant Examiner—Ben D. Tobor
Attorney—Koenig, Senniger, Powers and Leavitt

[57] ABSTRACT

A system of domes for use in pouring voided (i.e., ribbed) concrete slabs comprising relatively short end domes for use at the ends of a span and two or three relatively long intermediate domes for use between two end domes, and involving a set of different length end domes and a set of different length intermediate domes adapted, by suitable combination of the lengths, to bridge spans in a series of lengths differing by an increment such as 6 inches or 1 foot.

14 Claims, 6 Drawing Figures

FIG. 6

SYSTEM OF DOMES FOR USE IN MOLDING CONCRETE SLABS

BACKGROUND OF THE INVENTION

This invention relates to a system of domes for use in molding voided concrete slabs for ceilings or floors of buildings, and more particularly to a system of domes employing relatively short end domes for use at the ends of a span and relatively long intermediate domes for use between two end domes, providing for use of a minimum number of different length domes to form molds for a series of slab spans differing in length by an incremental amount.

A system of domes for use in molding voided concrete slabs using different length domes to mold slabs of various spans is known. Reference may be made to U.S. Pat. No. 3,388,452 for such a system. This system has certain limitations, such as being limited in the length of domes that may be used (e.g., 9 feet being the greatest length referred to), and in being limited generally to the same treatment for the ends of a slab as for its intermediate region.

SUMMARY OF THE INVENTION

Among the several objects of this invention may be noted the provision of an improved system of domes for molding voided concrete slabs in which a minimum number of different length domes are used to form molds for pouring voided concrete slabs of various spans; the provision of such a system of domes in which domes for forming special end configurations in the slabs may be economically included in the system; and the provision of such a system for forming concrete slabs of various spans which may be economically adapted to provide for irregular span length or special incremental span lengths. In general, a system of domes of this invention comprises a set of end domes for use at the ends of a span and a set of intermediate domes for use between the end domes. The set of end domes includes dome length L. The set of intermediate domes consists of domes of a number N of different lengths including a first intermediate dome length $L_1$ expressed by the formula $L_1=LN$, and a second intermediate dome length $L_2$ expressed by the formula $L_2=L(N+1)$. Other objects and features will be in part apparent and in part pointed out hereinafter.

BRIEF DESCRIPTION OF THE DRAWINGS

FIG. 6 is a view showing the manner in which a minimum number of different length domes of another system of this invention may be combined to form molds for a series of span lengths differing by a 1-foot interval.

Corresponding reference characters indicate corresponding parts throughout the several views of the drawings.

DESCRIPTION OF THE PREFERRED EMBODIMENTS

Figure 1:
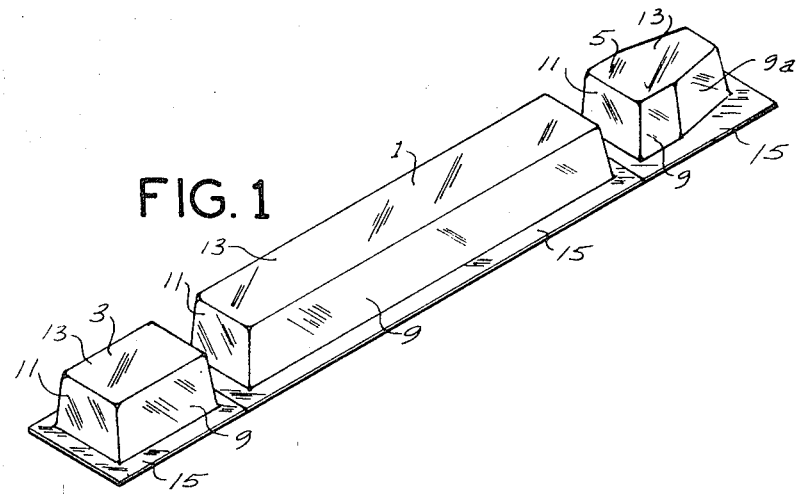
FIG. 1 is a perspective of an intermediate dome disposed between two end domes in accordance with the system of this invention.

Referring to the drawings, FIG. 1 shows a relatively long intermediate dome 1 disposed between two relatively short end domes 3 and 5 to form a row of domes to be used with additional similar rows of domes to form a mold for pouring a concrete slab 7 constituting a floor or ceiling of a building. The domes are intended to be reused and are preferably made of polyester reinforced with glass fiber. However, it will be understood that the domes may be constructed of other plastics or sheet metal. In general, the domes are elongated inverted pans having sloping sidewalls 9 and sloping ends 11 which are angled inwardly toward a flat top portion 13, to facilitate removing the domes from a cured slab. A horizontal peripheral flange 15 extends outwardly from the lower portions of the sidewalls 9 and ends 11 of each dome. The flanges 15 are adapted to butt the flanges of adjacent domes when the domes are used to form a mold for pouring the concrete slab 7.

Figure 2:
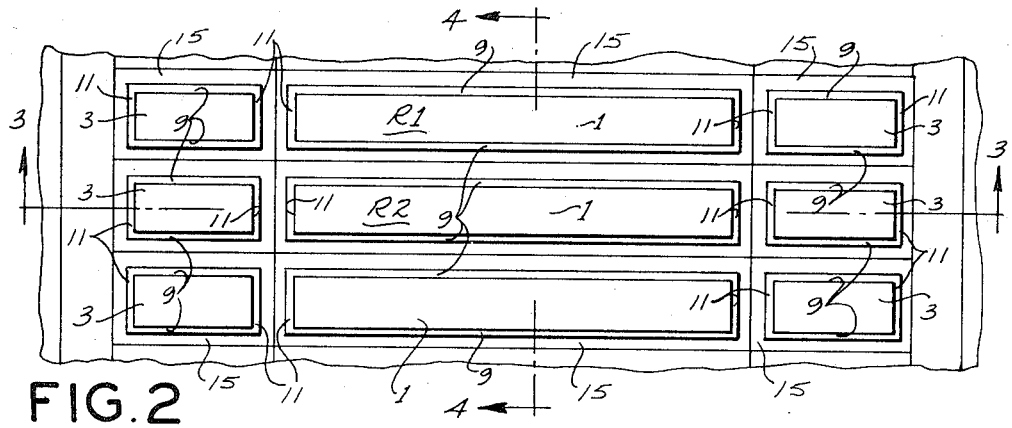
FIG. 2 is a plan of a typical arrangement of domes placed on a deck to form a mold for pouring a voided concrete slab.

FIG. 2 shows a typical dome arrangement used in molding voided concrete slabs 7 employing a system of domes of this invention. As shown therein, a first row of domes indicated at R1 is placed on a wooden deck 19, this row comprising an intermediate dome 1 between two end domes 3, the domes being laid end-to-end in this row. A second row R2 of domes identical to the first row R1 is placed adjacent the first row. This is repeated until the desired area is covered. When all of the domes are in place on the decking, concrete is poured over the domes and is leveled to form a slab of the desired thickness. The decking 19 and the rows of domes span the distance between a pair of beams 21 which support the ends of the poured concrete slab. Temporary posts 23 are normally required to support the decking, domes and wet concrete during the pouring operation and while the concrete is curing.

Figure 3:
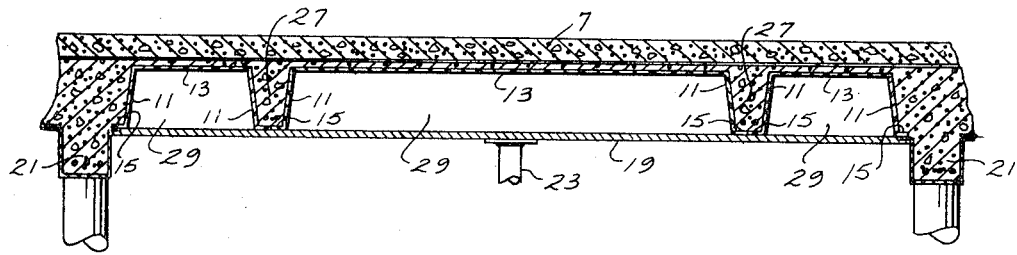
FIG. 3 is a vertical longitudinal section on line 3—3 of FIG. 2 showing the domes after a concrete slab has been poured over the domes.
Figure 4:
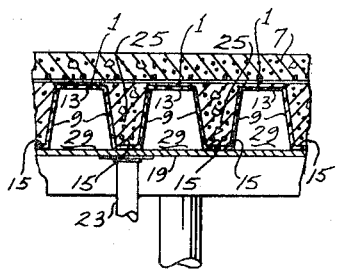
FIG. 4 is a vertical transverse section on line 4—4 of FIG. 2 similar to FIG. 3.

FIGS. 3 and 4 show the domes with the concrete in place. The concrete fills the spaces between the domes to form spanwise joists 25 and transverse joists 27. The space 29 between the domes and the deck 19 is void of concrete; hence the name "voided slab." Joists 25 extend between the beams 21 which are shown in FIG. 3 as poured integral with the slab 7. Joists 25 are spaced at regular intervals, the center-to-center distance corresponding to the width of the domes. The spacing of joists 27 is irregular as it depends on the length of the domes, which varies because of the difference in lengths of the intermediate and end domes 1 and 3. Because of the uniformity of the distance between joists in one direction, this system of domes is often called a one-way joist forming system. End dome 5 (as shown in FIG. 1) has sidewalls 9a tapering inwardly from bottom to top of the dome and also tapering inwardly toward one end thereof. End domes 5, having sidewalls 9a tapering inwardly toward one end, are used to form joists having flared or thickened ends. Such joists are advantageously used to reduce the unit stress in the joist adjacent the ends, the ends of the joist being the location of maximum shear. Since the end domes 5 are relatively short, they may be adapted to provide joists with thickened or flared ends at a fraction of the cost of adapting longer domes used in other systems to provide such joists.

A system of domes according to this invention comprises a set of end domes 3 and 5 for use at the ends of the span and a set of intermediate domes 1 for use between the end domes. The set of end domes includes a dome length L. The set of intermediate domes consists of domes of a number N of different lengths including a first intermediate dome length $L_1$ expressed by the formula $L_1=LN$, and a second intermediate dome length $L_2$ expressed by the formula $L_2=L(N+1)$. The set of intermediate domes may also comprise a third intermediate dome length $L_3$, this length being expressed by the formula $L_3=L(N+2)$. This system provides for use of a minimum number of domes of different lengths to form molds for slabs in a series of lengths differing by an incremental distance.

Figure 5:
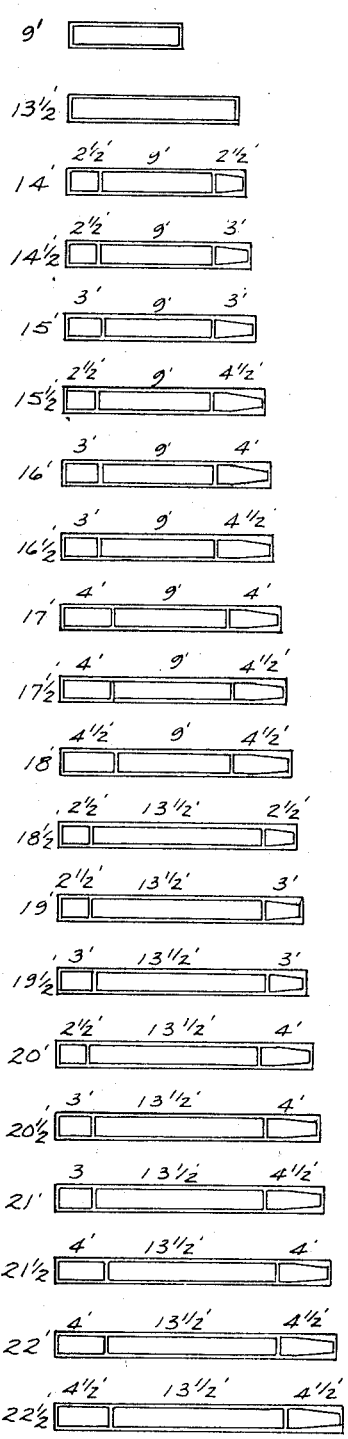
FIG. 5 is a view showing the manner in which a minimum number of different length domes of one system of this invention may be combined to form molds for a series of span lengths differing by a 6-inch increment.
Figure 5:
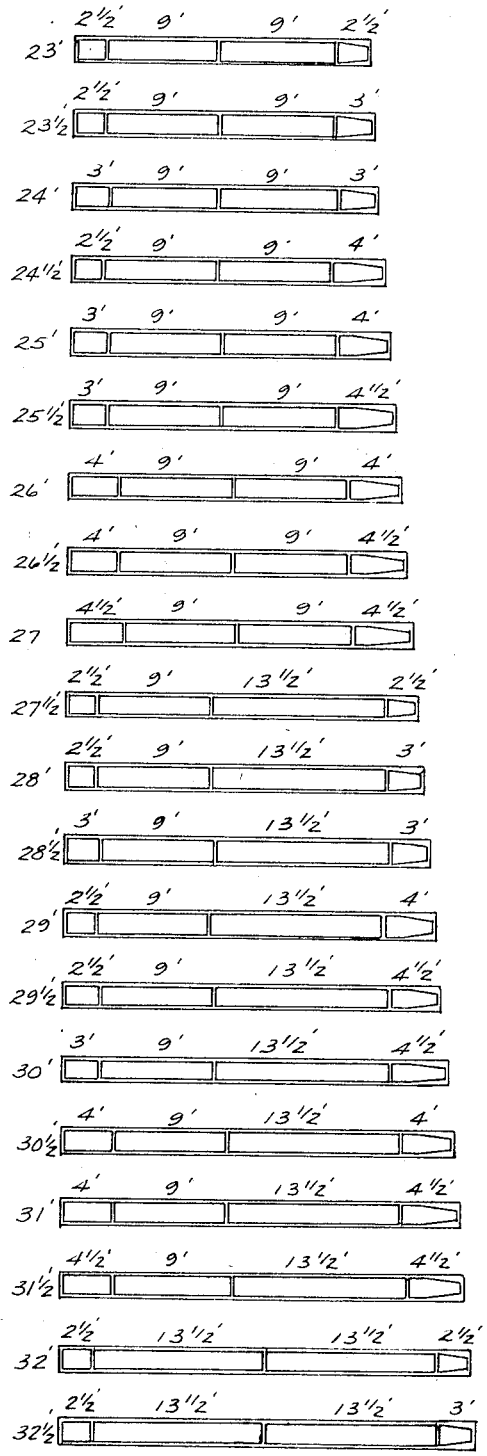

An example of such a system of domes is shown in FIG. 5. For simplicity, only a single row of domes is shown to illustrate the various spans that may be formed using various combinations of end and intermediate domes. The lengths of the spans are indicated at the left of each row of domes and the length of the individual domes is indicated above each dome. The end domes at the right are shown as being tapered-width domes 5 while those at the left are the uniform-width domes 3. This exemplifies the versatility of the system showing how it can be economically adapted to provide for thickened or flared ends on one or both ends of the slab. The system shown in FIG. 5 comprises a set of end domes including dome length $L$ equal to 4½ feet and a set of two different intermediate dome lengths (i.e., $N=2$). The first intermediate dome length $L_1$, expressed by the formula $L_1=LN$, thus equals 9 feet. Similarly, the second intermediate dome length $L_2$, expressed by the formula $L_2=L(N+1)$, thus equals 13½ feet. The set of end domes comprises domes of at least two different lengths and may comprise up to four different dome lengths. With two end domes in the end dome set differing in length by one incremental unit (e.g., 1 foot or one-half foot), the maximum for $L$ is three of these units. With three end domes in the end dome set differing in length by one incremental unit, the maximum for $L$ is five of these units. With four end domes in the end dome set, the first and second differ in length by one unit, the second and third by two units, and the third and fourth differ by one unit, and the maximum for $L$ is nine of these units. Thus, one four-dome end dome set made in accordance with the invention comprises end domes 2½ feet, 3 feet, 4 feet and 4½ feet long, the incremental unit here being one-half foot and $L$ being equal to nine times one-half or 4½. Such a series of end domes combined with the 9-foot and 13½-foot intermediate domes provides for the formation of rows of domes having an intermediate dome between two end domes which spans any distance from 14 feet on up, in ½-foot increments. The systems herebefore described may be called a bimodular system since it has two lengths of intermediate domes. The relationship of the lengths of the intermediate domes in a bimodular system may also be expressed by the ratio of 2:3. When so expressed, the length of one of the end domes is one-half the length of the shorter length intermediate domes. Assuming, as in the system herebefore described, the shorter length intermediate domes have a length of 9 feet, the length of one of the end domes would be 4½ feet, and using the 2:3 ratio, the other intermediate dome length is determined to be 13½ feet. Thus it may be seen that the lengths of domes may be determined by referring to the formulas or to the relationship of lengths expressed as a ratio.

To show another example of a bimodular system of domes as set forth by this invention, assume a system of domes having a set of two end domes including a dome length $L$ equal to the maximum of 3 feet. The other end dome length would then be either 2 or 40 feet. Since the system is a bimodular system, the set of intermediate domes consists of domes of two different lengths (i.e., $N=2$). The first intermediate dome length $L_1$, expressed by the formula $L_1=LN$, thus equals 6 feet. The second intermediate dome length $L_2$, expressed by the formula $L_2=L(N=19$ feet. A system of domes comprising a set of end domes 2- and 3-feet long or 3- and 4-feet long and a set of intermediate domes 6- and 9-feet long may be combined to form rows of domes to span any distance from 10 feet on up in 1-foot increments. Other combinations for the end dome set may be 3, 3½, 4½ and 5 feet, 4, 4½, 5½ and 6 feet, and 4½, 5, 6 and 6½ feet.

Figure 6:
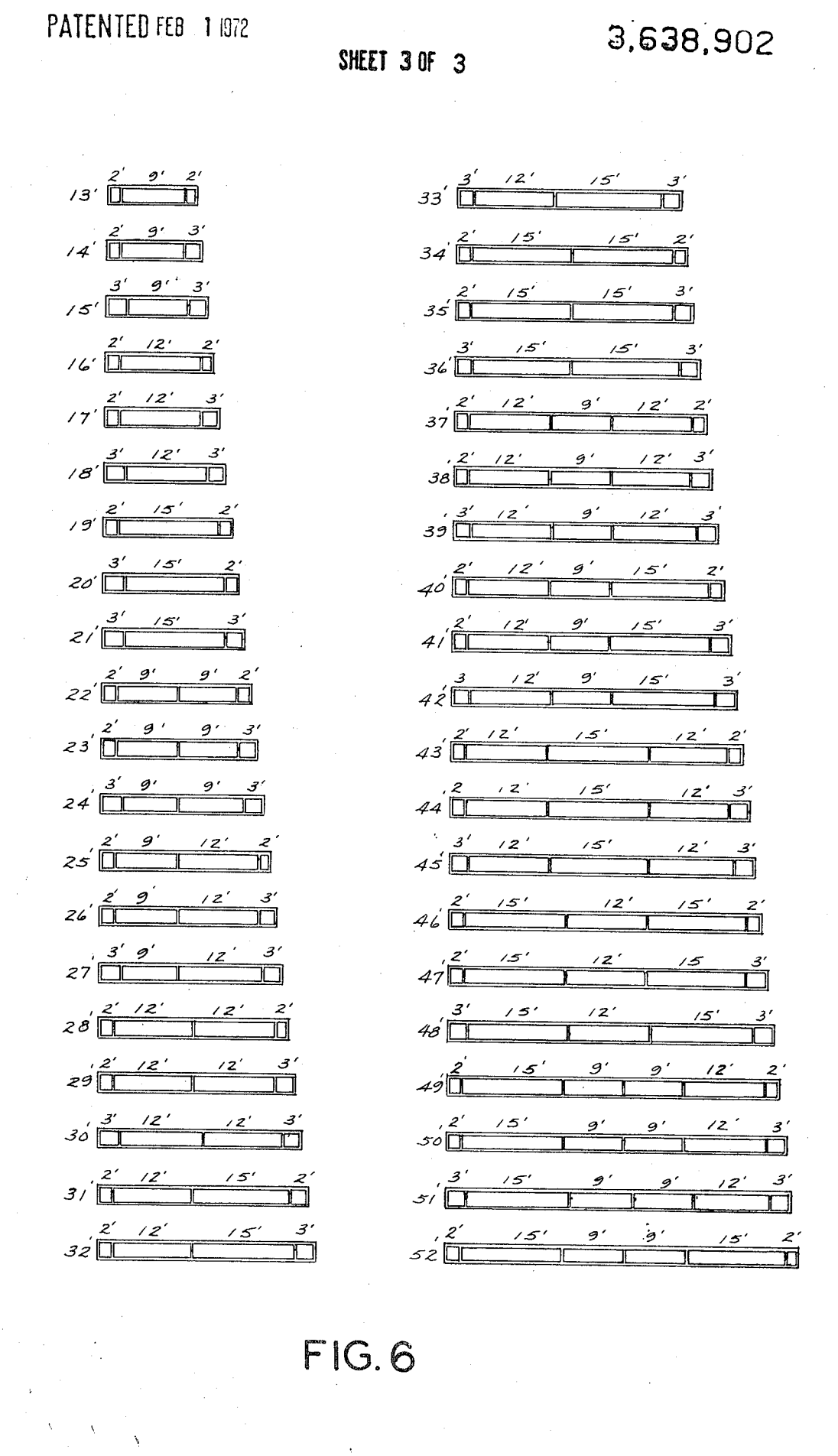

A trimodular system of domes for use in molding concrete slabs of various span lengths differing by a 1-foot increment is shown in FIG. 6. Only a single row of domes is shown to illustrate the various spans that may be formed using various combinations of end and intermediate dome lengths. This system comprises a set of two end domes including a dome length $L$ equal to the maximum of 3 feet and a set of three different intermediate dome lengths (i.e., $N=3$). The other end dome length as shown in FIG. 6 is 2 feet, but it could be 4 feet. The first intermediate dome length $L_1$, expressed by the formula $L_1=LN$, thus equals 9 feet. Similarly, the second intermediate dome length $L_2$, expressed by the formula $L_2=L(N+1)$, thus equals 12 feet. The third intermediate dome length $L_3$, expressed by the formula $L_3=L(N+2)$, thus equals 15 feet. Such a system having end domes 2 feet and 3 feet long will span any distance from 13 feet on up in 1-foot increments. Substituting 4-foot long end domes for 2-foot long end domes, the system will span any distance from 15 feet on up in 1-foot increments. The relationship of the lengths of the intermediate domes in the trimodular system may also be expressed by the ratio 3:4:5. When so expressed, the length of one of the end domes is one-third the length of the shortest intermediate dome. Assuming, as in the trimodular system herebefore described, the length of the shortest intermediate dome is 9 feet, the length of one of the end domes would be 3 feet, and using the ratio 3:4:5, the other intermediate dome lengths would be 12 feet and 15 feet. In the trimodular system, the same lengths may be determined by referring to the formulas or to the relationship of lengths expressed as a ratio.

Each of the systems of domes herebefore described includes relatively short end domes on the ends of each row of domes bridging the various incremental span lengths so that domes which provide special end configurations in the slabs, irregular span lengths and special incremental span lengths may be economically included within each system by adding thereto relatively inexpensive end domes of the desired size or shape.

In view of the above, it will be seen that the several objects of this invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A system of domes for use in molding voided concrete slabs by positioning the domes on decking and pouring concrete over the domes, with a minimum number of domes of different lengths for molding slabs of various spans differing by an incremental amount, said system comprising a set of end domes for use at the ends of a span and a set of intermediate domes for use between the end domes, the set of end domes including a dome length $L$ the set of intermediate domes consisting of domes of a number $N$ of different lengths, including a first intermediate dome length $L_1$ equal to $LN$ and a second intermediate dome length $L_2$ equal to $L(N+1)$.

2. A system of domes as set forth in claim 1 wherein the set of intermediate domes includes domes of a third intermediate dome length $L_3$ equal to $L(N+2)$.

3. A system of domes as set forth in claim 1 wherein the set of end domes comprises a series of two or three domes having an incremental variation in length or a series of four domes having an incremental variation between the shortest and second length and between the third and longest length and having a variation of two incremental amounts between the second and third lengths.

4. A system of domes as set forth in claim 3 wherein the incremental variation is 6 inches.

5. A system of domes as set forth in claim 1 wherein the set of end domes has domes with the length $L$ equal to 3 feet and the set of intermediate domes consists of domes of two different lengths, whereby the first intermediate dome length is 6 feet and the second intermediate dome length is 9 feet.

6. A system of domes as set forth in claim 5 wherein the set of end domes comprises domes 2 feet and 3 feet long or 3 feet and 4 feet long.

7. A system of domes as set forth in claim 1 wherein the set of end domes has domes with the length $L$ equal to 4½ feet and the set of intermediate domes consists of domes of two different lengths, whereby the first intermediate dome length is 9 feet and the second intermediate dome length is 13½ feet.

8. A system of domes as set forth in claim 7 wherein the set of end domes comprises domes having lengths of 2½ feet, 3 feet, 4 feet and 4½ feet.

9. A system of domes as set forth in claim 7 wherein the set of end domes also comprises domes having a length of 3, 3½ and 5 feet.

10. A system of domes as set forth in claim 7 wherein the set of end domes also comprises domes having a length of 4, 5½ and 6 feet.

11. A system of domes as set forth in claim 7 wherein the set of end domes also comprises domes having a length of 5, 6 and 6½ feet.

12. A system of domes as set forth in claim 2 wherein the set of end domes has domes with the length $L$ equal to 3 feet and the set of intermediate domes consists of domes of three different lengths, whereby the first intermediate dome length is 9 feet, the second intermediate dome length is 12 feet and the third intermediate dome length is 15 feet.

13. A system of domes as set forth in claim 12 wherein the set of end domes comprises domes having a length of 2 feet.

14. A system of domes as set forth in claim 12 wherein the set of end domes comprises domes having a length of 4 feet.

* * * * *

UNITED STATES PATENT OFFICE
CERTIFICATE OF CORRECTION

Patent No. 3,638,902      Dated February 1, 1972

Inventor(s) Philipp O. Bergan

It is certified that error appears in the above-identified patent and that said Letters Patent are hereby corrected as shown below:

Column 2, line 60, "N=1" should read -- N+1 --; line 63, "N=2" should read -- N+2 --. Column 3, line 27, "systems" should read -- system --; line 44, "40" should read -- 4 --; line 50, "L(N = 19 feet." should read -- L(N+1), thus equals 9 feet.--. Column 4, line 35, "L the" should read -- L, the --; line 36, "of of" should read -- of --.

Signed and sealed this 27th day of June 1972.

(SEAL)
Attest:

EDWARD M. FLETCHER, JR.
Attesting Officer

ROBERT GOTTSCHALK
Commissioner of Patents